(12) United States Patent
Deorah et al.

(10) Patent No.: US 10,681,639 B2
(45) Date of Patent: Jun. 9, 2020

(54) SYSTEMS AND METHODS FOR RECEIVING SENSOR DATA FROM A MOBILE DEVICE

(71) Applicant: HyperTrack Inc., Menlo Park, CA (US)

(72) Inventors: Kashyap Deorah, Bangalore (IN); Abhishek Poddar, Bangalore (IN); Amit Rathi, Bangalore (IN); Aman Jain, Bangalore (IN); Utkarsh Ohm, Bangalore (IN); Gunjan Gupta, Bangalore (IN); Ravi Jain, Bangalore (IN); Prajakt Deolasee, Bangalore (IN)

(73) Assignee: HYPERTRACK INC., Menlo Park, CA (US)

( * ) Notice: Subject to any disclaimer, the term of this patent is extended or adjusted under 35 U.S.C. 154(b) by 0 days.

(21) Appl. No.: 15/981,581

(22) Filed: May 16, 2018

(65) Prior Publication Data

US 2018/0368068 A1    Dec. 20, 2018

Related U.S. Application Data

(60) Provisional application No. 62/520,432, filed on Jun. 15, 2017.

(51) Int. Cl.
| | | |
|---|---|---|
| *H04M 3/00* | (2006.01) | |
| *H04W 24/00* | (2009.01) | |
| *H04W 52/02* | (2009.01) | |
| *H04W 4/029* | (2018.01) | |
| *H04W 64/00* | (2009.01) | |
| *H04W 4/02* | (2018.01) | |
| *G08G 1/127* | (2006.01) | |

(52) U.S. Cl.
CPC ....... *H04W 52/0229* (2013.01); *H04W 4/025* (2013.01); *H04W 4/029* (2018.02); *H04W 64/003* (2013.01); *G08G 1/127* (2013.01)

(58) Field of Classification Search
None
See application file for complete search history.

(56) References Cited

U.S. PATENT DOCUMENTS

| | | | | |
|---|---|---|---|---|
| 2007/0294360 A1* | 12/2007 | Ebling | ............... | A61B 5/14532 709/208 |
| 2009/0275348 A1* | 11/2009 | Weinreich | ............. | G01S 5/0036 455/456.3 |
| 2014/0195071 A1* | 7/2014 | Hunt | ...................... | G07C 5/085 701/1 |
| 2015/0172868 A1* | 6/2015 | Kang | .................... | H04W 4/029 455/456.1 |
| 2017/0180929 A1* | 6/2017 | Cavendish | ............ | H04W 4/021 |

\* cited by examiner

*Primary Examiner* — Erika A Washington
(74) *Attorney, Agent, or Firm* — David R. Stevens; Stevens Law Group (57) ABSTRACT

A source device includes various sensors, such as a GPS receiver. The source device provides operation context data to a server that indicates movement of the source device. The source device may also provide a movement context. The server also evaluates usage of data from the device by other applications or devices to determine a usage context. Based on the movement, operation, and usage contexts, the server selects a frequency at which data is collected for a sensor and a frequency at which the data is transmitted to the server. For example, where the device is not moving or is indoors, less location data is collected. Where no user is tracking the device, location data may be transmitted less frequently and may also be collected less frequently.

3 Claims, 5 Drawing Sheets

SYSTEMS AND METHODS FOR RECEIVING SENSOR DATA FROM A MOBILE DEVICE

RELATED APPLICATION

This application claims the benefit of U.S. Provisional Application Ser. No. 62/520,432, filed Jun. 15, 2017 and entitled SYSTEMS AND METHODS FOR MANAGING GPS DATA, which is hereby incorporated herein by reference in its entirety for all purposes.

BACKGROUND

Field of the Invention

This invention relates to collecting GPS data from mobile devices.

Background of the Invention

Many applications enable a first device to display the movement of another device. For example, ride-hailing services such as Uber or Lyft enable a passenger to view the location of a driver on a map. Such applications require the tracked device to perform GPS (global positioning system) readings and to transmit those readings to the tracking device, such as by way of a server. However, operating a GPS receiver and the radio required for transmission of readings drains the battery on the tracked device and uses cellular data bandwidth.

The system and methods disclosed herein provide an improved approach for tracking mobile devices to reduce power and network bandwidth consumption.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

When tracking the location of a device, each use of a sensor, such as a GPS receiver, and each transmission of an output of the sensor, such as the location of the device, is a drain on the battery of the device. Accordingly, real-time retrieval of sensor data, such as location, using prior approaches comes at the cost of shortened battery life for the device. The approach described below enables real-time retrieval of sensor data from a device while reducing battery usage.

The solution described below may be understood with respect to two principles. First, the battery cost of transmitting GPS data is about 5 to 10 times the cost of collecting the data. In short, using radio and cellular network on the phone is much more battery intensive than using the GPS receiver. This was established by performing a wide array of experiments on variety of devices and operating systems under different network conditions, and geographies in over a hundred countries.

The second principle is that active tracking sessions are sparse. In a typical tracking session, a user tracking a driver actually looks at the tracking screen less than 20% of the time. This intuitively makes sense as well—if one is tracking a friend on an hour long journey, one might pull out the phone 3-4 times for couple of minutes each. Real time transmission (active-mode) of GPS data is required only during those short periods when someone is actively tracking the device, e.g. a driver. In the remaining time, only enough GPS data need be collected to accurately meter the traveled distance and draw the route taken (passive-mode).

The systems and methods described below provide a variable frequency (VF) model for retrieval of sensor data, such as GPS data. Using this approach, one does not collect and transmit sensor data at a single static frequency. Instead, the system receives an operating context of the device, a movement context of the device, and a usage context of the sensor data. The system then pushes corresponding commands to code executing on the tracked device to collect and transmit sensor data at different frequencies at different points in time. For example, the code executing on the tracked device may be a SDK (software developer's toolkit) integrated into a client application on the tracked device.

For example, in one implementation, when a driver is being actively tracked the system instructs the tracked device to collect movement data (as measured by GPS, WI-FI, BLUETOOTH cellular tower triangulation, etc.) every few meters and transmit it every other second. When active tracking stops, the system changes movement data collection to every 50 meters, for example, and changes transmission to a batch of data every two minutes. This change in transmission frequency from every two seconds to every two minutes has tremendous positive impact on battery life. The benefit is amplified by the fact that the tracked device naturally operates in passive-mode for most of the tracking session.

By decoupling collection and transmission frequency one gains more fine grained control over how the code executing on the tracked device uses resources (battery, network, etc.). By making both these frequencies dynamic, one can harness that control to provide a real time tracking experience to customers with reduced battery usage.

In another example, the operating context of the tracked device includes a percentage of energy capacity available in a battery of the tracked device and whether the tracked device is charging. In this example, a rules engine may periodically evaluate these parameters and selects the frequency values (collection and transmission) corresponding to the current values for these parameters and communicates the frequency values down to the code executing on the tracked device.

The rules engine may take into account other aspects of the operating context of the tracked device or the usage context of the data provided by the tracked device. For example, the identity of the user using the sensor data stream from the tracked device, what activity is the tracked device experiencing during a trip, what latency does a tracking user expect during the trip. Any number of these or other factors may be considered when selecting either of the collection frequency and the transmission frequency.

Figure 1:
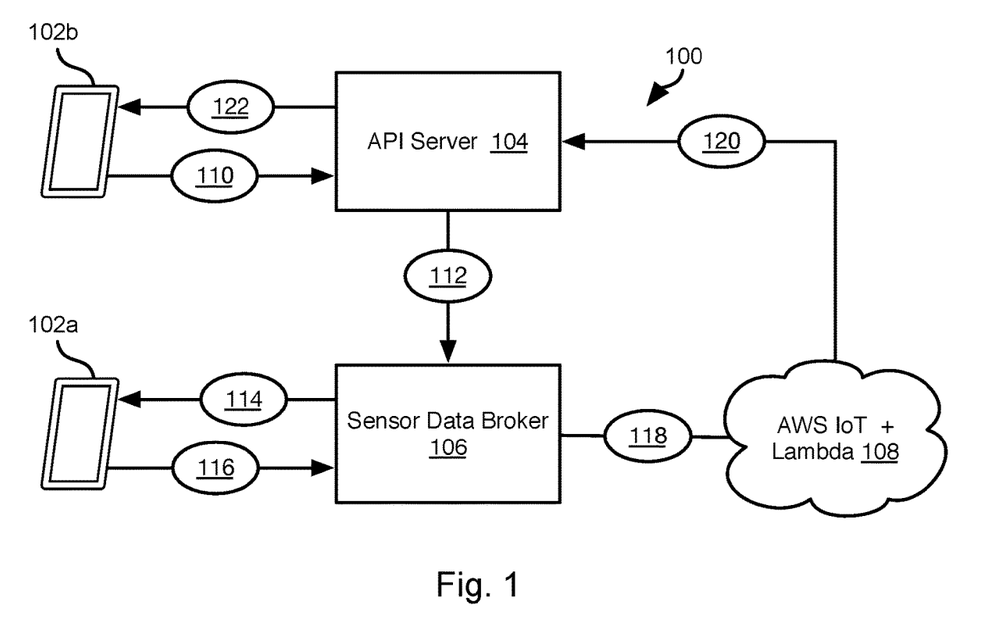
FIG. 1 is a schematic block diagram of components implementing a system in accordance with an embodiment of the present invention.

Referring to FIG. 1, the methods disclosed herein may be performed using the illustrated system 100. A mobile device 102a includes a GPS (global positioning system) receiver and possibly other sensors such as a set of accelerometers (e.g., 3 axis accelerometer set), gyroscope, magnetometer, pedometer, light sensor, or the like. The mobile device 102a may also include antennas and transmitting and receiving circuits for communicating over various wireless communication protocols such as WI-FI, cellular data communication (4G, 5G, LTE (Long Term Evolution), etc.), BLUETOOTH, and the like.

The systems and methods disclosed herein are particularly suitable for tracking of a device 102a, accordingly the device 102a will most often be a mobile device. However, any device with sensors may be used in accordance with the methods disclosed herein. The methods disclosed herein provide examples regarding the collection of GPS data from a GPS receiver of the device 102a. However, the methods disclosed herein may be used to set the collection and transmission frequencies of outputs of any of the sensors of the device 102a.

A representation of the outputs of one or more of the sensors may be provided to another device 102b, that may be a mobile device, laptop computer, desktop computer, or any other computing device. Accordingly, in the examples disclosed herein, the device 102a is referred to as the source device 102a and the device 102b is referred to as the consumer device 102b.

In one example, source device 102a is carried by a driver and consumer device 102b is viewed by a supervisor of the driver, a customer who requested delivery by the driver, a recipient of an item to be delivered by the driver, or a passenger to be picked up by the driver.

The consumer device 102b may be in communication with a server 104 providing an API (application programming interface). For example, a client application on the consumer device may issue function calls to the API server 104 and receive responses that may then be rendered on the consumer device 102b or otherwise processed by the client application. The client application may likewise receive and execute function calls from the API server 104.

Sensor data from the source device 102a may be received by a sensor data broker 106. The sensor data broker 106 may be implemented as an ECLIPSE MOSQUITO (MQTT) broker. The sensor data broker may open a bidirectional TCP (transmission control protocol) connection between the source device 102a and the broker 106 to send and receive data. The protocol used for communication may be MQTT, which is a lightweight protocol that is designed to reduce battery and data usage. The messages may be using QoS (quality of service) 1 according to the MQTT protocol, which guarantees message delivery. The connection also uses sessions so that messages sent to and from the device 102a are not lost in case the device 102a goes offline.

The sensor data broker 106 may both receive sensor data from the source device 102a and transmit instructions to the source device 102a indicating a frequency that sensor readings are to be collected and a frequency that collected readings are to be transmitted to the sensor data broker 106. The server 104 and broker 106 may reside on the same server computer or be hosted by different server computers.

A single source device 102a may generate a large amount of sensor data. Naturally, the server 104 and broker 106 will interface with many source and consumer devices 102a, 102b. Accordingly, sensor data may be stored in and accessed from a storage solution, such as a database. In the illustrated embodiment, sensor data is stored in an AWS IoT (Amazon Web Services Internet of Things) cloud 108 (herein after "the cloud 108"). The cloud 108 may also perform data processing as instructed by the API server 104 in order to offload computationally intensive tasks to the cloud 108. As known in the art, the AWS IoT implements "Lambda," which allows for the execution of code without prior provisioning of computational or storage resources.

An example use of the system 100 is described below:
1. A driver is on a trip and an SDK (software development kit) programmed to interface with the sensor data broker 106 is active on the driver's source device 102a. At some point in the trip a user (consumer) wishes to track the driver. Accordingly, at step 110, the consumer device 102b polls the API server 104 for location data about the driver as instructed by the consumer.
2. In response to this request, the API server 104 may return the most current location data available to the server for the source device 102a. The API server may also push 112 a message to the sensor data broker 106 to invoke more frequent collection and transmission of location data by the source device 102a.
3. The sensor data broker 106 transmits 114 a message to an SDK executing on the source device 102a including an instruction to increase the collection frequency and transmission frequency. For example, the message may be of the format:
{"tracking_rules": {"predicates": [ ], "default_rule": {"auto": true}}, "collection_rules": {"predicates": [{"eq,activity.type,stop": {"result":
{"location.displacement": 10, "activity.collection_frequency": 5, "location.collection_frequency": 5}}},
{"eq,activity.type,walk": {"result":
{"location.displacement": 5, "activity.collection_frequency": 5, "location.collection_frequency": 5}}},
{"eq,activity.type,drive": {"result":
{"location.displacement": 50, "activity.collection_frequency": 5, "location.collection_frequency": 5}}},
{"eq,activity.type,run": {"result":
{"location.displacement": 10, "activity.collection_frequency": 5, "location.collection_frequency": 5}}},
{"eq,activity.type,cycle": {"result":
{"location.displacement": 20, "activity.collection_frequency": 5, "location.collection_frequency": 5}}}],
"default_rule":
{"location.displacement": 50, "activity.collection_frequency": 5, "location.collection_frequency": 5}},
"transmission_rules": {"predicates":
[{"eq,server.state,consumption": {"result": {"ttl": 300, "flush": false, "batch_size": 50, "batch_duration": 50, "preferred_channel": "http"}}}, {"and,eq, health.power.charging_status,charging,gte,health-.power.battery, 80": {"result": {"ttl": −1, "flush": false, "batch_size": 50, "batch_duration": 5, "preferred_channel": "http"}}}, {"eq,action.state,assigned": {"result": {"ttl": −1, "flush": false, "batch_size": 50, "batch_duration": 5, "preferred_channel": "http"}}}, {"eq,action.state,arrived": {"result": {"ttl": −1, "flush": false, "batch- _size": 50, "batch_duration": 5, "preferred_channel": "http"}}}, {"eq,action.state,completed": {"result": {"ttl": −1, "flush": false, "batch_size": 50, "batch_duration": 5, "preferred_channel": "http"}}}], "default_rule": {"ttl": −1, "flush": false, "batch_size": 50, "batch_duration": 300, "preferred_channel": "http"}}}'

4. In response to receiving the message, the SDK on the source device 102a starts collecting and transmitting 116 location data more frequently at the increased collection and transmission frequencies instructed by the sensor data broker 106.
5. The sensor data broker 106 may be bridged to the cloud 108 and transmit 118 sensor data received from the source device 102a to the cloud 108 for storage and possibly processing.
6. In some embodiments, code executing on the cloud 108 may respond to messages from broker 106 with sensor data by generating a call 120 to the API server 104. For example, the call to the API server 104 may include the sensor data a result of processing of the sensor data by the cloud 108 (e.g., filtering, ETA calculation, logging, etc., see discussion of FIG. 4).
7. The API server 104 may then transmit 122 the result of processing to the consumer device 102b either with or without additional processing or modification. The API server 104 may also store the sensor data received from the cloud 108.

Steps 116, 118, 120, and 122 may be performed repeatedly to enable the consumer device 102b to receive updates on the location of the source device 102a over time. The API server 104 or sensor data broker 106 may also monitor operation of the source device 102a and usage of the sensor data (e.g. movement measurements) by the source device 102b as reported by the API server 104 in order to adjust the frequency of collection and transmission. The method by which the frequency of collection and the frequency of transmission are determined is described below with respect to FIG. 3.

Figure 2:
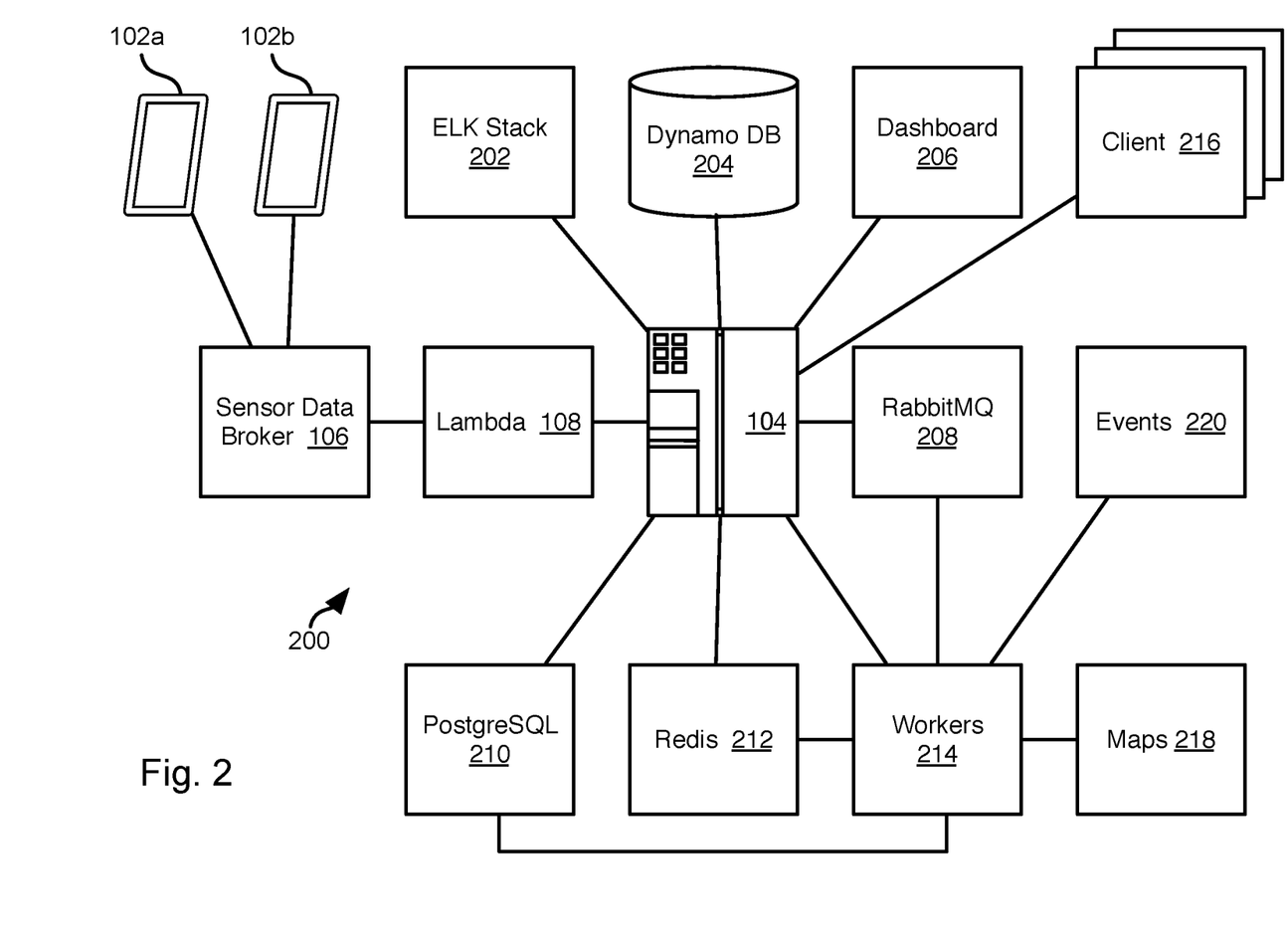
FIG. 2 is a schematic diagram illustrating an architecture for implementing systems and methods in accordance with an embodiment of the present invention.

Referring to FIG. 2, the API server 104, sensor data broker 106, and source and consumer devices 102a, 102b of the system 100 may operate as part of the illustrated architecture 200. For example, the API server 104 may be programmed to perform functions using sensor data, which may include using services provided by one or more other server systems or on the API server 104. These services may include: an ELK server (Elastic Stack) 202, Dynamo DB (non-SQL database with document or key-value storage scheme) 204, a dashboard 206 (e.g., interface for viewing key metrics of server performance and operation), RabbitMQ 208 (a message broker software implementing AMQP (advanced message queueing protocol)), PostgreSQL 210 or some other SQL (standard query language) database, Redis 212 or other in-memory database system storage scheme, and one or more worker threads 214 ("workers 214").

The API server 104 may also interface with client applications 216 that request access to interfaces and data exposed by the API server. The client applications 216 may execute on consumer devices 102b or other computing devices.

The API server 104 may expose a REST (representational state transfer) API over a network, such as the Internet. This REST API may implement an authentication and authorization layer and control a request-response lifecycle. The methods disclosed herein for controlling the collection and transmission frequencies of sensor data may be implemented by this REST API. The REST API may define data structures that map to entities like trips and tasks. The REST API may therefore act as a gateway for retrieving all stored data, which may be stored in a PostgreSQL database 210 for persistence. The REST API may further define executable code for taking actions described herein. The REST API may be written in Python/Django or other programming language and may run on a uWSGI (Web Server Gateway Interface) or other type of application server. Each application server may run on a single logical instance. The application server may be configured through environment variables and be otherwise stateless. This allows for easy horizontal scaling of instances behind a load balancer.

Workers 214 may be invoked by the API server 104 to process sensor data and also take as an input map data 218. In particular, location data from a source device 102a may be evaluated with respect to map data to determine its movement context as described below with respect to FIG. 3.

The worker threads 214 may generate events 220 based on processing of the sensor data. For example, worker threads 214 may evaluate the operating context of a source device 102a according to the sensor data and map data 218 and generate events 220 to be processed by the API server 104 or sensor data broker 106. For example, events 220 may indicate that a device 102a is within a structure (home, store, etc.) or a public transportation vehicle (ferry, train, bus, etc.). The API server 104 or sensor data broker 106 implementing the logic described below with respect to FIG. 3 may then process these events 220 in order to determine an appropriate collection and transmission frequency for one or more sensors of a source device 102a.

The workers 214 may operate in the background to process asynchronous jobs that can be offloaded from the request-response lifecycle. These are jobs that are typically either long running, CPU intensive or not time sensitive. This allows the operator to reduce time spent in processing a request and handle more requests instead. The jobs are put on queue (e.g., RabbitMQ 208) and picked up by workers 214. Workers 214 can either be multiprocessing based or event based. The event-based workers 214 are ideal to handle IO-bound jobs (like pushing webhooks or updating ETAs (estimated times of arrival)) and the multiprocessing workers are ideal for CPU-bound jobs (like filtering location data). CELERY is a python based job processing framework that may be used to implement the workers 214.

Figure 3:
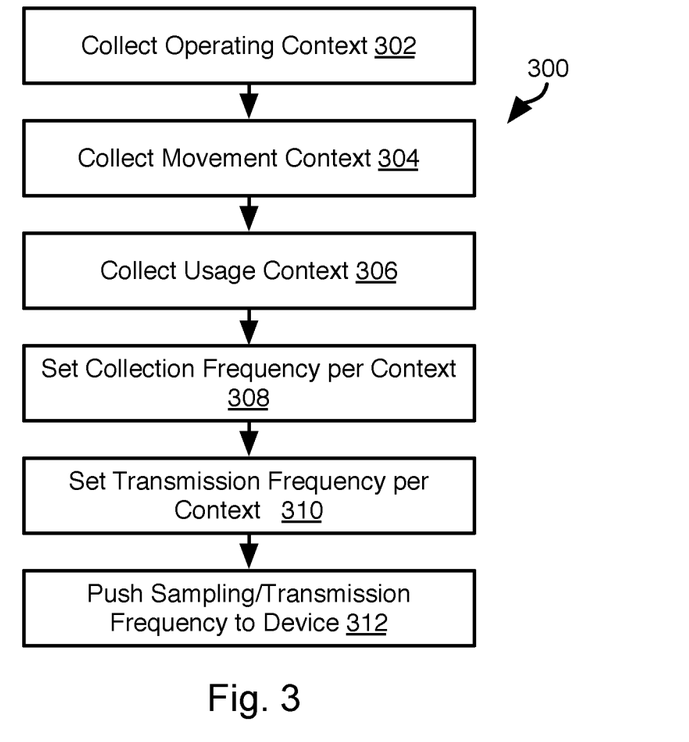
FIG. 3 is a process flow diagram of a method for controlling frequency of collecting and transmitting of sensor data in accordance with an embodiment of the present invention.

FIG. 3 illustrates a method 300 that may be executed using the system 100, such as using the architecture shown in FIG. 2. The method 300 may be executed periodically by the API server 104 or other component of the system 100 in order to adjust one or both of the frequency and collection and frequency of transmission of data for one or more sensors of the source device 102a. For example, the method 300 may be executed in response to change in one or both of the operating context of the source device 102a and the usage context for sensor data from the source device 102a.

The method 300 may include collecting 302 operating context data received from the source device 102. The operating context may include raw sensor data or data characterizing attributes of outputs of one or more sensors of the source device 102a. For example, operating context data may include some or all of:
  measurements from a GPS receiver (e.g., location, altitude, speed, bearing, etc.);
  Acceleration measurements from a set of accelerometers;
  A step count from a pedometer;
  Readings from a gyroscope;

Readings from a light sensor;
Outputs of a magnetometer; and
Outputs of a light sensor.

Any of these outputs may be a series of measurements over time. For example, outputs of sensors that define the operating context may be collected over time for each sensor and then sent as batch according to a transmission interval, upon determination that the sensor outputs indicate a change of sufficient magnitude, or upon receiving a request from the API server 104.

Other measurements that may define the operating context may include operational parameters of radios and antennas for communicating according to one or more wireless protocols. For example, usage and signal strength for a cellular antenna and corresponding radio, a WI-FI antenna and corresponding radio, or the like.

The operating context of the source device may include other aspects of the health of the device, such as battery state (percentage of charge remaining), whether the device is charging, available network bandwidth, current processor usage, or other values describing the state of operation of the source device 102a.

The collection of operation context 302 may therefore be considered to include collecting two types of context data (1) activity of the user or carrier of the source device 102a and (2) data characterizing the state and health of the device 102a as a computing and electronic device.

The method 300 may include collecting 304 a movement context of the source device 102a. For example, using the GPS location measurements received from the source device 102a and map data, step 304 may include identifying structures, routes, roads, or other entities referend in map data that coincide with the location measurements. For example, a set of GPS locations that lie along a road, train track, ferry route, or the like indicates a movement context of traveling along that road, riding a train on that track, or riding a ferry on that ferry route, respectively. A GPS location within (or within some margin of error from) of a structure such as a store, office, house, sporting venue, or other structure indicate that the movement context is likely the interior of that structure. An output of a light sensor may indicate that the source device 102a is indoors or outdoors based on intensity and color of detected light.

The method 300 may further include collecting 306 usage context. In particular, the usage context may include whether a representation of the location of the source device 102a is currently being requested by or displayed on the consumer device 102b. In one example, the usage context may include whether a process executing on the API server 104 is currently processing data from a particular sensor. In yet another example, access to output of a sensor for the source device 102a may be performed by issuing an API call to the API server 104 (see step 110, FIG. 1). Accordingly, the usage context may be whether such as call has been received, the number of such calls during a time window (e.g., the last 1-5 seconds or some other interval), or some other descriptor of API calls requesting sensor data or a representation of sensor data for a particular sensor of the source device 102a.

The method 300 may further include setting 308 a collection frequency and setting 310 a transmission frequency for one or more sensors of the source device 102a according to the operating context, movement context, and usage context. An instruction may be pushed 312 to the source device 102a that instructs the source device 102a to collect and transmit data according to the values selected at steps 308 and 310. For example, the instruction may list for each sensor for which a collection frequency and transmission frequency was set (e.g., changed relative to previous values), the new values for the collection frequency and transmission frequency for the each sensor.

The manner in which the collection frequency and transmission frequency are set may be determined by a rules engine that is programmed to handle particular scenarios for the contexts of steps 302-306. Table 1, below, summarizes the various sensors and other components of the source device 102a that may be used to establish the operating context of the source device 102a. Note that some devices are used directly to define the operating context whereas others indicate the operating context only indirectly.

Table 2 summarizes how a rules engine would adjust the collection and transmission frequency for a particular operating context and movement context of the source device 102a. Table 2 applies to the usage context of another application tracking the source device 102a, e.g. a user on a consumer device 102b requesting tracking of the source device 10a. Table 3 provides example of how the collection and transmission frequencies may be adjusted based on the operating context and movement context where the usage context is that no application is currently tracking the source device 102a.

The values for frequencies and other values in Tables 2 and 3 are exemplary only. The frequencies and values for each scenario (operation, movement, and usage contexts) may be understood to illustrate the relative magnitude of frequencies relative to other scenarios listed. Unless otherwise noted herein the word "about" shall be understood to indicate within 25% of the following value.

TABLE 1

Sources for Operating Context

| Sensor name | Type of Use (directly/indirectly/ intended) | Description |
| --- | --- | --- |
| GPS | directly | For collecting location |
| Accelerometer | directly | For detecting current activity like walking, running, cycling and stopping of a user |
| Gyroscope | directly | For detecting current activity |
| Pedometer | directly | For detecting if current activity of user is walking or running |
| Magnetometer | intended | For detecting whether a user is indoors or outdoors |
| Wi-Fi | directly + indirectly + intended | Directly: for detecting whether a user is connected to the Internet. Indirectly: for getting locations through hotspots location using fused location API provided by OS. Intended: Use Wi-Fi hotspot to find out whether a user is indoor/outdoor |
| Cellular | directly + indirectly | Directly: for detecting whether a user is connected to the Internet Indirectly: for getting locations through cell tower triangulation using fused location API provided by OS. |
| Light sensor | intended | For detecting whether a person is indoor or outdoor or vehicle type if he/she is moving (car/bike) |

TABLE 2

Rules for Selecting Collection and Transmission Frequencies During Tracking

| Operating Context | Data transmission rule | Data collection rule | Description |
|---|---|---|---|
| User is stopped at a place. GPS locations within time period (e.g., about every 30 seconds) are separate by less than a threshold distance (e.g., about 2 meters) | No transmission | GPS data is collected at a very low frequency (e.g., about every 30 min). User's activity data is collected to check if the user has started walking or driving. If yes then the frequency of GPS data collection is increased (e.g., when there is a change of, for example, about 50 meter in user's location or about every 10 seconds, whichever is earlier), In other embodiments, an exponential backoff may be implemented, e.g., keep lowering the frequency (subject to some minimum) until movement is detected | Since the device is not moving there is no need to transmit any data. GPS data collection is done at a very low frequency (e.g., about every 30 min). However, data from other sensors like accelerometer etc. is collected without transmission to find out when the user has started moving, so that the GPS data collection can again be started if required. |
| User is moving (condition for user being stopped is not met) | The frequency of data transmission is very high (e.g., about every 5 seconds) | OS on source device 102a is instructed to perform collection based on distance moved (e.g., when there is a change greater than about 50 m or after about 5 seconds, whichever is earlier). | Helps to collect and transmit data in real time. |
| User is walking and the adjacent data points are far from each other (the calculated speed of walking based on this data is greater than about 10 Km/h). | The frequency of data transmission is very high (e.g., about every 5 seconds) | OS on source device 102a is instructed to perform collection based on distance moved (e.g., when there is a change greater than about 20 m or after about 5 seconds, whichever is earlier), | If a user is walking and their walking speed comes out to be more than the speed a normal human can walk, then there was likely an error in data. It makes sense then to increase the data collection frequency so as to improve accuracy. |
| User is moving, however the location points are being incorrectly mapped to two different roads. | The frequency of data transmission is very high (e.g., about every 5 seconds) | OS on source device 102a is instructed to perform collection based on distance moved (e.g., when there is a change greater than about 20 m or after about 5 seconds, whichever is earlier), | If the location points are being mapped to two different roads, then there is something wrong with the location tracking. It makes sense then to increase the data collection frequency so as to improve accuracy. |
| User is driving at a very high speed (greater than about 60 mph) | The frequency of data transmission is high (about every 20 seconds). | OS on source device 102a is instructed to perform collection based on distance moved (e.g., when there is a change greater than about 200 m or after about 20 seconds, whichever is earlier). | Since the user is moving at a very high speed on a road, it is likely that the user will keep on moving on that road for a while (next 30-60 seconds). So the transmission speed and the collection frequency can be marginally lowered |

TABLE 3

Rules for Selecting Collection and Transmission Frequencies Without Tracking

| Operating Context | Data transmission rule | Data collection rule | Description |
| --- | --- | --- | --- |
| User is moving | the frequency of data transmission is very low (e.g., about every 30 min) | OS on source device 102a is instructed to perform collection based on distance moved (e.g., when there is a change greater than about 50 m or after about 10 seconds, whichever is earlier). | To save on battery, we send this data in bulk with very low frequency (about every 30 mins) |
| Geofence expected close to user's location | Variable frequency depending on how close the user is to a geofence If the user is more than 500 m away from the geofence or moving away from the geofence then keep the transmission frequency low (e.g., about every 1 min). If the user is less than 500 m from the geofence and moving towards the geofence then increase the transmission frequency to very high (e.g., about every 5 seconds) | Variable frequency depending on how close the user is to a geofence. If the user is more than 500 m from the geofence, then collect data when there is a change greater than about 50 m or say after 10 seconds, whichever is earlier. If the user is less than about 500 m from the geofence then collect data when there is a change greater than about 20 m or about every 5 seconds, whichever is earlier. | Since the user is not being tracked live, data transmission can be done at a much lower frequency. However, there are events which need to be triggered which can be missed if the frequency is low. Therefore, increase or decrease the frequency based on user's proximity to the geofence location. Geofence location could be a structure (home, office, store) or any area of interest. |

The scenarios of Tables 2 and 3 are exemplary only and various other scenarios are contemplated. For example, the movement context may indicate that the user is within an area such as a building, public transit vehicle (bus, train, ferry, airplane), or other defined area. Movements of the user within that area may be of little concern for tracking purposes. Accordingly, the movement context may be determined by evaluating the location of the source device 102a as reported to the API server 104 with respect to a geofence or other boundary defined for the area.

Whether the source device 102a is indoors may also be determined by evaluating relative strength of Wi-Fi and cellular signals received by the source device 102a. Where Wi-Fi signals are above a pre-defined Wi-Fi threshold and the cellular signal is below a pre-defined cellular threshold, the source device 102a may be determined to be indoors. Likewise, an output of the light sensor of the source device 102a may be consistent with being indoors. Where the location of the source device 102a travels at a speed and route corresponding to a train track or ferry route, the source device 102a may be determined to be on a train or in a ferry. Where the route, speed, and location of the device 102a correspond to the route, speed, and expected location of a bus or other public transit vehicle according to transit schedule, the device 102a may be inferred to be on that public transit vehicle.

Upon determining that the source device 102a is in a defined area having a rule associated with it by the rules engine, the API server 104 may instruct the source device 102a to collect data at a collection frequency and transmit data at a transmission frequency while the source device is within the area as defined by the rule for the defined area. In general, this collection frequency and transmission frequency will be lower than the collection frequency and transmission frequency when the source device 102a is not within an area having a rule associated with it by the rules engine.

Note that the above rules relate primarily to collection of GPS data. However, the collection frequency and transmission frequency of any of the other sensors described herein may be controlled according to operation, movement, and usage contexts in the same manner as desired by a developer. For example, a pedometer output may be collected and transmitted at high frequencies when the operation context indicates the source device 102a is indoors whereas the collection and transmission of GPS data is performed at relatively lower frequencies when the source device is indoors.

Figure 4:
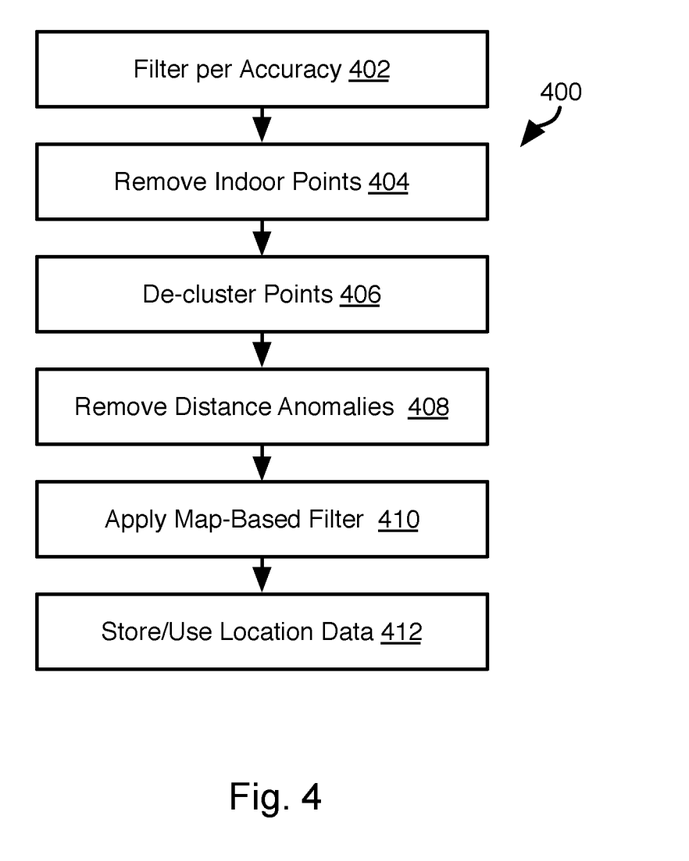
FIG. 4 is a process flow diagram of a method for filtering sensor data in accordance with an embodiment of the present invention.

Referring to FIG. 4, the illustrated method 400 may be used to filter sensor data received from a source device 102a, such as data collected and transmitted at frequencies determined according to the methods described above.

The sensor data that is received on the API server 104 may be written to a database such as one or both of Redis 212 and PostgreSQL 210. A job may be queued to process the sensor data. One of the workers 214 may then pick up the job from the queue and read the data from the database, such as from the Redis 212. Redis 212 may also store all pre-context for the data just received. Pre-context may be defined as context data (operation, usage, movement context data as defined above) that was received from the source device 102a prior to receiving collected and transmitted sensor data. Storing all of this data on Redis allows for fast reads that speeds up execution time significantly.

The sensor data may be filtered according to the steps of the method 400. These steps may be performed in the order shown or may be reordered in other embodiments.

The method 400 may include filtering 402 the data points in the sensor data according to accuracy. For example, in the case of a GPS point, the signal strength as received from the GPS satellites may be recorded and transmitted with the data points. Accordingly, in periods where there are not a minimum number of satellites with signal strengths above a signal strength threshold, GPS readings during those periods may be discarded The method 400 may further include removing 404 indoor points. Whether a point is indoors may be determined using geofencing, detected Wi-Fi and cellular signal strengths, GPS signal strengths, proximity of GPS points to a structure, or any other approach for determining whether a device is located indoors. Indoor points tend to have a lot of noise and are therefore typically not useful for tracking.

The method 400 may further include de-clustering 406 points. This step removes points that are located close to one another, e.g. within a predetermined distance threshold, causing a line connecting them to zigzag.

The method 400 may include removing 408 distance anomalies. In particular, this may include removing points that are located a predetermined maximum distance from a trace defined by other points in a stream of points from the source device 102a.

The method 400 may further include applying 410 a map-based filter that attempts to match points to the nearest road, route, or other trace that can be traversed by a vehicle or pedestrian. For example, this may include applying the OSM (Open Street Map) filter to the GPS points.

Once all the filters are run, the filtered data may be stored 412 in PostgreSQL and may be used as the accurate location stream for any purpose. For example, recalculating estimated times of arrival (ETAs), generating live polylines, and generating events based on the location of the source device 102a.

For example, an ETA model may calculate an ETA based on 3 values:
1. Checkout time—time taken from start to get on the road
2. Transit time—time taken on the road
3. Checkin time—time taken to get off the road and complete the task At the start of a task, all three values are estimated and an initial ETA is calculated. For 1 and 3, a simple statistical average is used and for 2, maps services are used (Google maps or OSM setup).

After device data from the source device 102a is filtered, such as according to the method 400, a job is queued to recalculate the ETA to take into account the latest known information, i.e. ignoring 1 if the source device 102a is traversing the route and calculating the transit time of 2 from the last known position of the source device 102a in the filtered data. The ETA may be recalculated and stored in PostgreSQL as the current ETA. This is the ETA may be displayed on a dashboard 206 and provided to the consumer device 102b that is tracking the source device 120a.

Other values that may be of interest based on GPS data may include a status (on time, delayed, detoured), mileage traveled by a driver, or any other application for GPS location data.

In another example, the API server 104 may generate events 220 in response to filtering or based on calculation of an ETA. For example, these events may denote a deviation from previous state (like task is delayed or the source device 102a is moving away from destination). Once an event is created for an account, the event may be queued, such as on RabbitMQ 208, to be sent as a webhook. If the account has configured webhooks, these events may be delivered to the configured endpoint (e.g., a consumer device 102b) for that webhook by a worker 214. In some embodiments, webhooks wait for a delay (e.g., about 2 seconds) for the endpoint to receive the data and send an acknowledgment of successful receipt. In some embodiments, if a webhook cannot be delivered successfully, it's retried a specified number of times (e.g., three) until it can be delivered with an exponential back off.

In another example, metrics may be collected from the source device 102a, such as battery usage and data usage by the source device 102a. Code executing on the source device 102a, e.g. an SDK, may send device battery information in request headers with every request. The data usage may be estimated by the API server 104 based on the payload size of the requests. These metrics may be collected by the API server 104 for every request coming from the source device 102a and stored in a database. For example, the DynamoDB 204 may be used, which is a low latency, high throughput, NoSQL db which allows easily querying aggregate metrics.

In another example, logs of device data from multiple applications may be sent to the ELK server 202 for processing according to an ELK stack. The logs may be indexed and stored by the ELK stack. For example, the ELK stack may include the following logical units:
1. Logstash—Processes log messages and converts them to a structured JSON (JavaScript Object Notation). The Logstash may also hosts the different input methods for different sources. For example, API server logs and Mosquitto broker logs may be sent over rsyslog and app logs may be sent over MQTT.
2. Elasticsearch—Logstash produces a structured JSON output which is stored by Elasticsearch. All the logs are indexed to be searchable.
3. Kibana—Kibana is the frontend for Elasticsearch on the web. It hosts the web interface to search the log data stored in Elasticsearch. It also allows visualizations on top of log data.
4. Curator—Curator is a daily cron job that deletes indexes older than 10 days on Elasticsearch. This keeps Elasticsearch lean and fast.

Figure 5:
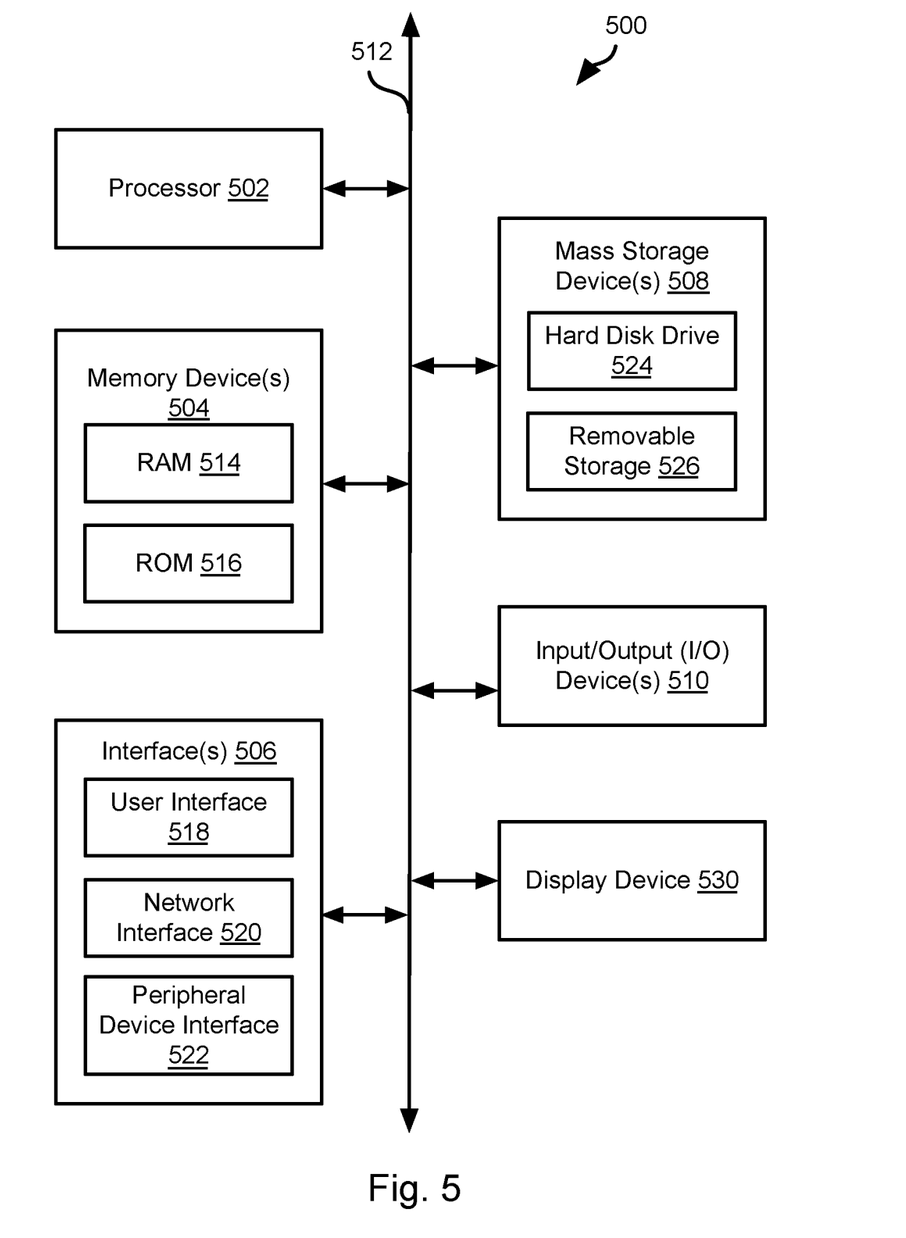
FIG. 5 is a schematic block diagram of an example computing device suitable for implementing methods in accordance with embodiments of the invention.

FIG. 5 is a block diagram illustrating an example computing device 500. Computing device 500 may be used to perform various procedures, such as those discussed herein. A computing device 500 may be used to implement the source device 102a, consumer device 102b, API server 104. The services in the architecture of FIG. 2 may also be implemented by a server having some or all of the attributes of the computing device 500.

Computing device 500 includes one or more processor(s) 502, one or more memory device(s) 504, one or more interface(s) 506, one or more mass storage device(s) 508, one or more input/output (I/O) device(s) 511, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices operably coupled to the one or more processing devices, the one or more memory devices storing executable code effective to cause the one or more processing devices to:
  receive, from a first mobile device, a first operating context of the first mobile device, the first mobile device including at least one sensor, the first operating context including a first moving speed of the first mobile device;
  select a first transmission frequency for the at least one sensor according to the first operating context; and
  transmit an instruction to the first mobile device to transmit outputs of the at least one sensor to the system at the first transmission frequency;
  receive, from the first mobile device, a second operating context of the first mobile device, the second operating context including a second moving speed of the first mobile device that is greater than the first moving speed;
  select a second transmission frequency for the at least one sensor according to the second operating context, the second transmission frequency being greater than the first transmission frequency;
  transmit an instruction to the first mobile device to transmit outputs of the at least one sensor to the system at the second transmission frequency;
  receive, from the first mobile device, a third operating context of the first mobile device, the third operating context including a third moving speed of the first mobile device that is greater than the second moving speed;
  select a third transmission frequency for the at least one sensor according to the second operating context, the third transmission frequency being lower than the second transmission frequency; and
  transmit an instruction to the first mobile device to transmit outputs of the at least one sensor to the system at the third transmission frequency.

2. A method comprising:
  providing a computer including one or more processing devices and one or more memory devices operably coupled to the one or more processing devices;
  receiving, by the computer, from a first mobile device, a first operating context of the first mobile device, the first mobile device including at least one sensor, the first operating context including a first moving speed of the first mobile device;
  selecting, by the computer, a first transmission frequency for the at least one sensor according to the first operating context; and
  transmitting, by the computer, an instruction to the first mobile device to transmit outputs of the at least one sensor to the system at the first transmission frequency;
  receiving, by the computer, from the first mobile device, a second operating context of the first mobile device, the second operating context including a second moving speed of the first mobile device that is greater than the first moving speed;
  selecting, by the computer, a second transmission frequency for the at least one sensor according to the second operating context, the second transmission frequency being greater than the first transmission frequency;
  transmitting, by the computer, an instruction to the first mobile device to transmit outputs of the at least one sensor to the system at the second transmission frequency;
  receiving, by the computer, from the first mobile device, a third operating context of the first mobile device, the third operating context including a third moving speed of the first mobile device that is greater than the second moving speed;
  selecting, by the computer, a third transmission frequency for the at least one sensor according to the second operating context, the third transmission frequency being lower than the second transmission frequency; and transmitting, by the computer, an instruction to the first mobile device to transmit outputs of the at least one sensor to the system at the third transmission frequency.

3. A non-transitory computer-readable medium storing executable code that, when executed by one or more processing devices, causes the one or more processing devices to:

receive, from a first mobile device, a first operating context of the first mobile device, the first mobile device including at least one sensor, the first operating context including a first moving speed of the first mobile device;

select a first transmission frequency for the at least one sensor according to the first operating context; and transmit an instruction to the first mobile device to transmit outputs of the at least one sensor to the system at the first transmission frequency;

receive, from the first mobile device, a second operating context of the first mobile device, the second operating context including a second moving speed of the first mobile device that is greater than the first moving speed;

select a second transmission frequency for the at least one sensor according to the second operating context, the second transmission frequency being greater than the first transmission frequency;

transmit an instruction to the first mobile device to transmit outputs of the at least one sensor to the system at the second transmission frequency;

receive, from the first mobile device, a third operating context of the first mobile device, the third operating context including a third moving speed of the first mobile device that is greater than the second moving speed;

select a third transmission frequency for the at least one sensor according to the second operating context, the third transmission frequency being lower than the second transmission frequency; and transmit an instruction to the first mobile device to transmit outputs of the at least one sensor to the system at the third transmission frequency.

* * * * *